(12) United States Patent
Steiner

(10) Patent No.: US 11,229,232 B2
(45) Date of Patent: Jan. 25, 2022

(54) APPARATUS FOR EXTRACTING JUICE AND PULP FROM FRUIT OR VEGETABLES

(71) Applicant: NOVIS AG, Luxembourg (LU)

(72) Inventor: Wolfgang Steiner, Mörigen (CH)

(73) Assignee: NOVIS AG, Luxembourg (LU)

( * ) Notice: Subject to any disclaimer, the term of this patent is extended or adjusted under 35 U.S.C. 154(b) by 0 days.

(21) Appl. No.: 17/008,792

(22) Filed: Sep. 1, 2020

(65) Prior Publication Data
US 2020/0390140 A1    Dec. 17, 2020

Related U.S. Application Data

(63) Continuation of application No. 13/993,688, filed as application No. PCT/EP2011/072602 on Dec. 13, 2011, now abandoned.

(30) Foreign Application Priority Data

Dec. 13, 2010   (EP) ..................................... 10194779

(51) Int. Cl.
*A23N 1/02* (2006.01)
*A47J 19/02* (2006.01)

(52) U.S. Cl.
CPC .............. *A23N 1/02* (2013.01); *A47J 19/023* (2018.08); *A47J 19/027* (2013.01)

(58) Field of Classification Search
CPC ............ A23N 1/02; A47J 19/02; A47J 19/027
See application file for complete search history.

(56) References Cited

U.S. PATENT DOCUMENTS

| | | | | |
|---|---|---|---|---|
| 2,097,082 A | * | 10/1937 | Rupert | A47J 19/023 99/503 |
| 2,246,641 A | * | 6/1941 | Spino | A23N 1/00 99/513 |
| 2,295,922 A | * | 9/1942 | Weston | A47J 19/027 99/503 |
| 2,302,138 A | * | 11/1942 | Nicholson | A47J 19/027 99/512 |
| 2,660,211 A | * | 11/1953 | Berglind | A47J 19/027 99/512 |
| 2,845,971 A | * | 8/1958 | Cordero | A47J 19/027 99/512 |
| 3,623,523 A | * | 11/1971 | Meyer | A47J 42/56 99/503 |
| 4,157,062 A | * | 6/1979 | Ackeret | A47J 19/023 99/503 |
| 4,506,601 A | * | 3/1985 | Ramirez | A47J 19/027 99/511 |
| 4,681,031 A | * | 7/1987 | Austad | A47J 19/027 99/511 |
| 4,840,119 A | * | 6/1989 | Caldi | A47J 19/027 241/74 |

(Continued)

*Primary Examiner* — Sean M Michalski
(74) *Attorney, Agent, or Firm* — WRB-IP LLP

(57) ABSTRACT

An apparatus is provided for processing fruit or vegetables in order to obtain a flowable mass, such as juice or puree and includes a receptacle, an extraction unit for mechanically extracting juice and pulp from the fruit or vegetables, the unit being located within the receptacle for discharging the juice and pulp into the receptacle, a motor unit, drivingly connected to the extraction unit, an outlet unit for collecting flowable mass from the receptacle.

20 Claims, 9 Drawing Sheets

(56) References Cited

U.S. PATENT DOCUMENTS

| | | | | |
|---|---|---|---|---|
| 4,993,116 | A * | 2/1991 | Urushibara | A22C 25/145 452/116 |
| 5,168,628 | A * | 12/1992 | Mock | B05B 11/0005 30/125 |
| 5,222,430 | A * | 6/1993 | Wang | A47J 19/023 99/512 |
| 5,257,575 | A * | 11/1993 | Harrison | A47J 19/027 99/511 |
| 5,289,763 | A * | 3/1994 | Le Rouzic | A47J 19/027 366/314 |
| 5,433,144 | A * | 7/1995 | Lee | A47J 19/027 99/511 |
| 5,495,795 | A * | 3/1996 | Harrison | A47J 19/027 241/37.5 |
| 5,613,430 | A * | 3/1997 | Lee | A47J 19/025 99/510 |
| 5,735,193 | A * | 4/1998 | Chang | A47J 43/044 241/282.1 |
| 6,050,180 | A * | 4/2000 | Moline | A47J 19/027 241/37.5 |
| 6,298,776 | B1 * | 10/2001 | Ekstrom | A47J 43/0716 99/509 |
| 6,397,736 | B1 * | 6/2002 | Tseng | A47J 19/027 99/511 |
| 6,604,455 | B2 * | 8/2003 | Areh | A47J 19/00 99/495 |
| 6,609,455 | B2 * | 8/2003 | Fouquet | A47J 19/027 99/511 |
| 7,044,051 | B2 * | 5/2006 | Le Rouzic | A47J 19/027 99/511 |
| 7,066,082 | B2 * | 6/2006 | O'Loughlin | A47J 19/027 99/511 |
| 7,217,439 | B2 * | 5/2007 | Sugino | B44C 1/24 427/11 |
| 10,334,979 | B2 * | 7/2019 | Barquin | A47J 19/027 |
| 11,051,658 | B2 * | 7/2021 | Neubert | A47J 43/046 |
| 2005/0126404 | A1 * | 6/2005 | Basora | A47J 19/023 99/501 |
| 2006/0153003 | A1 * | 7/2006 | Sands | A47J 43/0716 366/205 |
| 2006/0169152 | A1 * | 8/2006 | Lin | A47J 19/027 99/495 |
| 2007/0107609 | A1 * | 5/2007 | Barker | A47J 43/255 99/509 |
| 2010/0050886 | A1 * | 3/2010 | Obersteiner | A47J 19/027 99/507 |
| 2010/0116152 | A1 * | 5/2010 | Fouquet | A47J 19/023 99/501 |
| 2011/0083566 | A1 * | 4/2011 | Backus | A23N 1/003 99/511 |
| 2011/0240782 | A1 * | 10/2011 | Sands | A47J 43/046 241/282.2 |
| 2011/0271849 | A1 * | 11/2011 | Jays | A47J 19/027 99/511 |
| 2015/0059597 | A1 * | 3/2015 | Lee | A47J 19/023 99/513 |
| 2015/0164129 | A1 * | 6/2015 | Kim | A23N 1/02 99/513 |

* cited by examiner

APPARATUS FOR EXTRACTING JUICE AND PULP FROM FRUIT OR VEGETABLES

The present application is a continuation of U.S. application Ser. No. 13/993,688, filed Jun. 17, 1993, which is the U.S. national stage of International Application PCT/EP2011/072602, filed Dec. 13, 2011, which claims priority to European App. EP 10194779.4, filed Dec. 13, 2010, all of which are incorporated by reference.

BACKGROUND AND SUMMARY

The present invention relates to an apparatus for extracting juice and pulp from fruit or vegetables.

It is desirable to enhance the yield in the extraction of juice and pulp from fruit or vegetables.

According to a first aspect, a first apparatus is provided for extracting juice and pulp from fruit or vegetables in order to obtain a flowable mass, such as juice or puree, comprising:
 a receptacle;
 a cylindrical strainer located within said receptacle and rotatable about its axis of symmetry, said cylindrical strainer having a bottom and a perforated side wall;
 a motor unit for rotating said cylindrical strainer about its axis of symmetry;
 an inlet unit for introducing fruit or vegetables into said strainer;
 an outlet unit for collecting flowable mass from said receptacle, characterized in that the apparatus further comprises
 a flexible element located within said strainer and urged against the inside surface of said perforated side wall.

According to a second aspect, an apparatus is provided for extracting juice and pulp from citrus fruit, comprising:
 a receptacle;
 a strainer, preferably having a cylindrical shape, located within said receptacle and rotatable about a strainer axis, said strainer having a bottom and a perforated side wall;
 a citrus mill rotatable about a citrus mill axis, said citrus mill having a citrus mill dome provided with protrusions, preferably ribs, at its outer surface;
 a motor unit for rotating said strainer about said strainer axis and for rotating said citrus mill about said citrus mill axis;
 an outlet for collecting juice and pulp from said receptacle, characterized in that
 said citrus mill is located within said strainer;
 said strainer is rotatably driven via a strainer power train operatively connected between said motor unit and said strainer;
 said citrus mill is rotatably driven via a citrus mill power train operatively connected between said motor unit and said citrus mill.

The first apparatus and the second apparatus can be transformed into each other by exchanging their respective extraction units.

The extraction unit of the first apparatus includes
 the cylindrical strainer located within the receptacle and rotatable about its axis of symmetry by the motor unit, said cylindrical strainer having a bottom and a perforated side wall; wherein
 the flexible element located within the strainer and urged against the inside surface of the perforated side wall.

The extraction unit of the second apparatus includes
 the strainer located within the receptacle and rotatable about the strainer axis by the motor unit, said strainer having a bottom and a perforated side wall;
 the citrus mill rotatable about the citrus mill axis by the motor unit, said citrus mill having a citrus mill dome provided with protrusions, preferably ribs, at its outer surface; wherein
 said citrus mill is located within said strainer;
 said strainer is rotatably driven via a strainer power train operatively connected between the motor unit and the strainer;
 said citrus mill is rotatably driven via a citrus mill power train operatively connected between the motor unit and the citrus mill.

It is a further object of the present invention to prevent dripping of juice and pulp from the outlet of the apparatus.

According to a third aspect, an apparatus is provided for processing fruit or vegetables in order to obtain a flowable mass, such as juice or puree, comprising:
 a receptacle;
 an extraction unit for mechanically extracting juice and pulp from said fruit or vegetables, said unit being located within said receptacle for discharging said juice and pulp into said receptacle;
 a motor unit drivingly connected to said extraction unit;
 an outlet unit for collecting flowable mass from said receptacle,
 characterized in that said outlet unit comprises:
 a spout duct associated to an opening at the bottom of said receptacle; and
 a valve element for opening and closing said opening;
 said spout duct and said valve element being coupled to each other ("spout operated valve");
 said spout duct being pivotably supported about a horizontal axis and having an inner duct portion extending underneath said opening and an outer duct portion protruding from said apparatus;
 said pivotable spout duct being pivotable between a first position where said spout duct forms a downward slope from its inner duct portion to its outer duct portion and where said valve element is in its opened position, and a second position where said spout duct forms an upward slope from its inner duct portion to its outer duct portion and where said valve element is in its closed position.

BRIEF DESCRIPTION OF THE DRAWINGS

Other objects, advantages, features and applications of the invention(s) will become more apparent from the following detailed description of two preferred embodiments, given as examples not to be construed as limiting the scope of the invention(s), when taken in conjunction with the accompanying drawings.

DETAILED DESCRIPTION

Figure 1A:
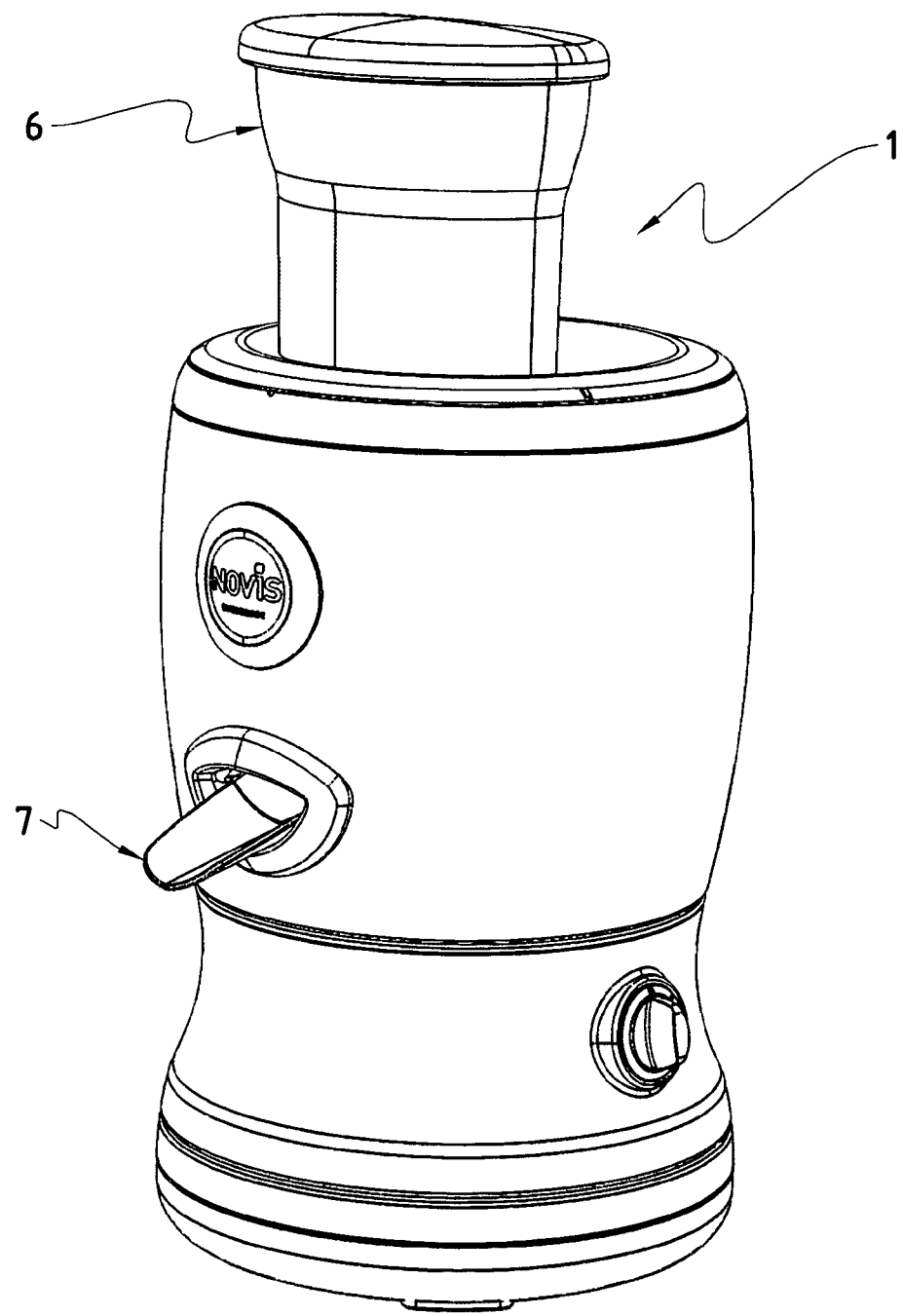
FIG. 1A is a schematic perspective view of the apparatus according to the first embodiment.
Figure 1B:
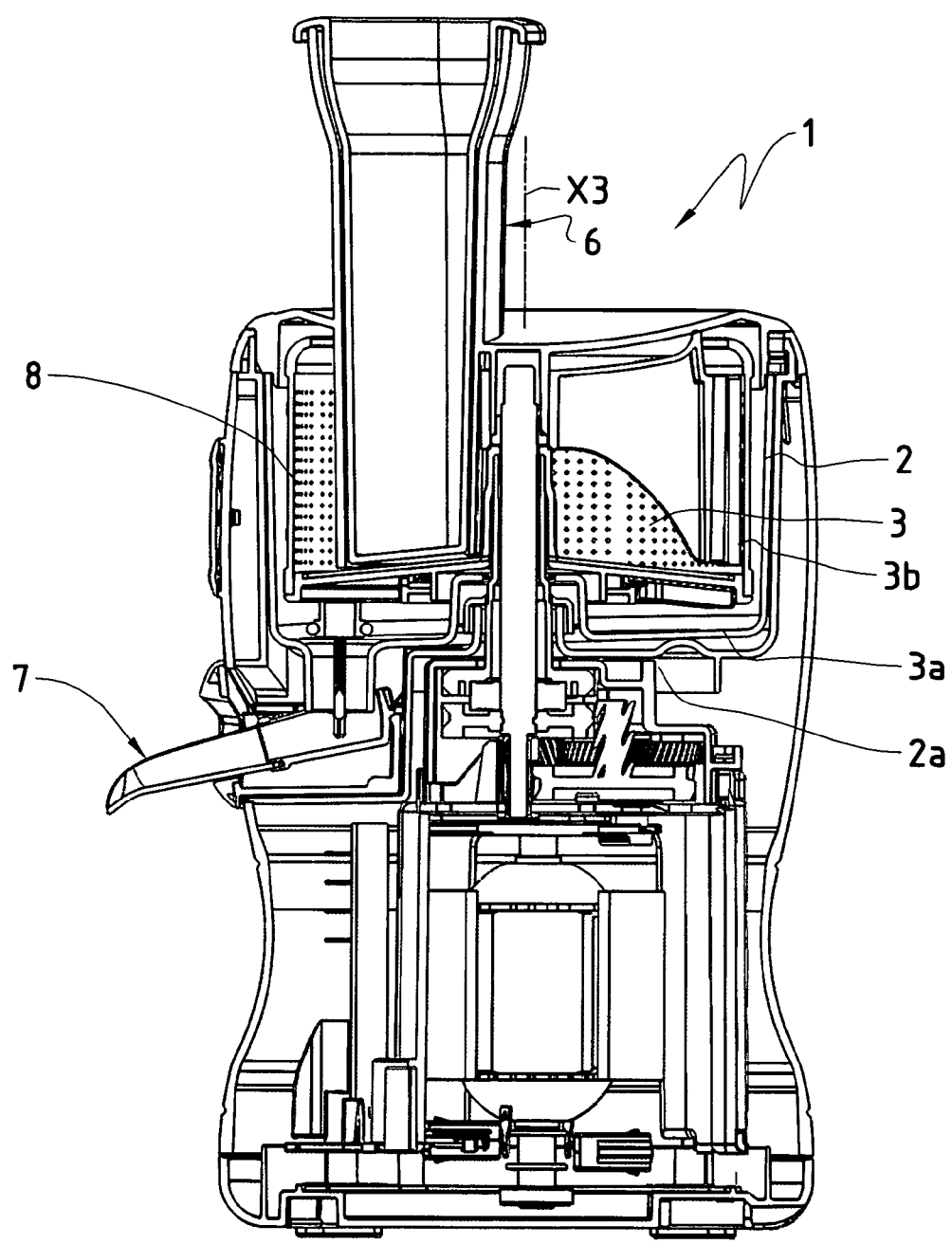
FIG. 1B is a schematic cross-sectional view of a vertical sectional plane of the apparatus according to the first embodiment.
Figure 2A:
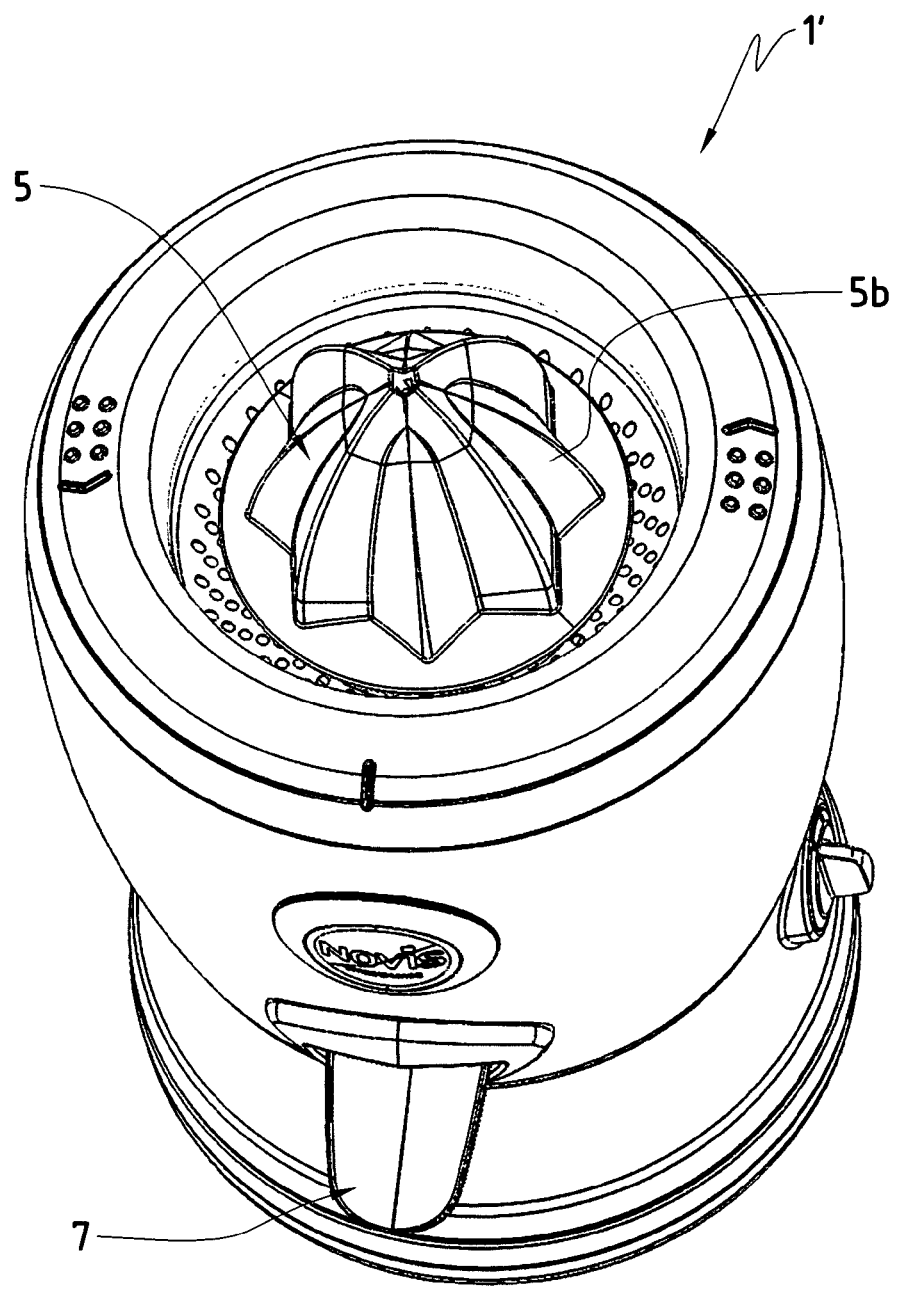
FIG. 2A is a schematic perspective view of the apparatus according to the second embodiment.
Figure 2B:
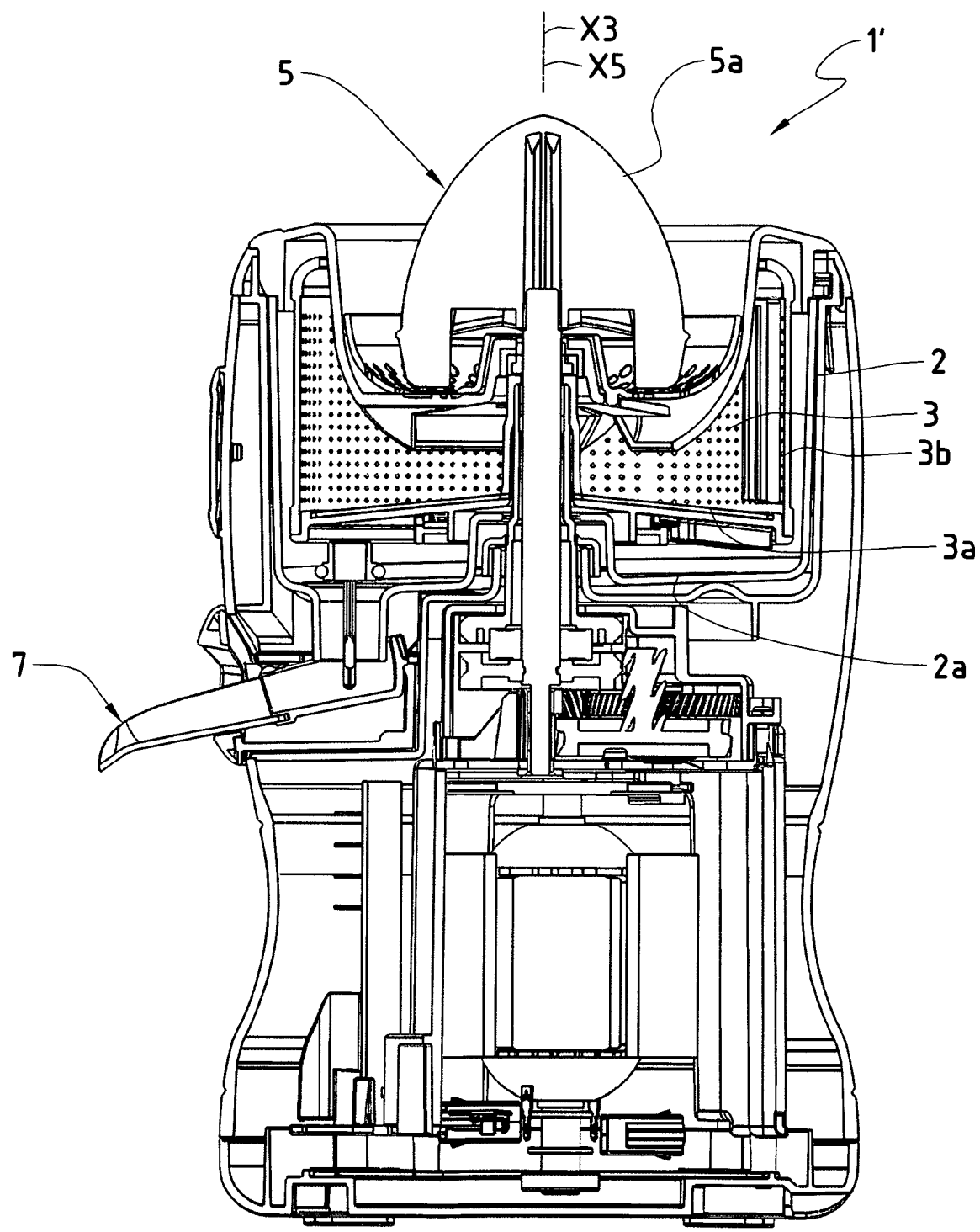
FIG. 2B is a schematic cross-sectional view of a vertical sectional plane of the apparatus according to the second embodiment.
Figure 3B:
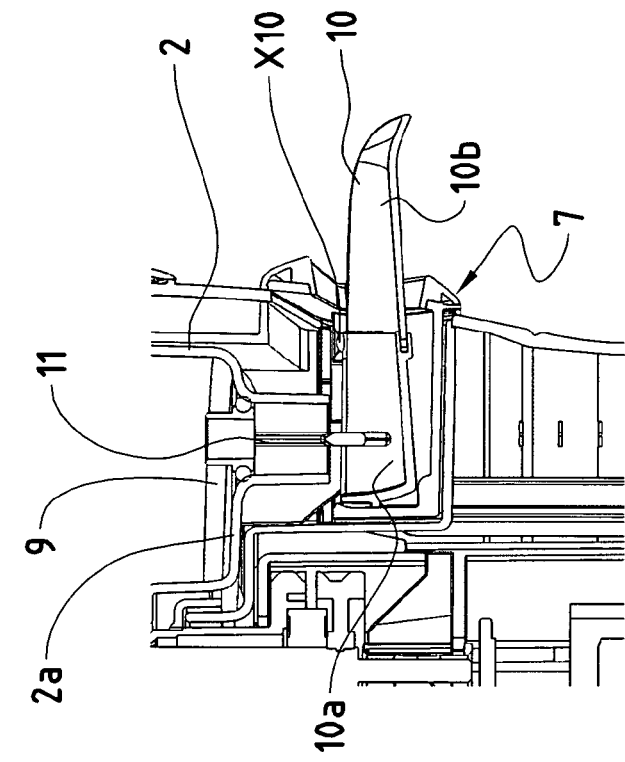
FIG. 3B is a schematic partial cross-sectional view of a vertical sectional plane of the apparatus showing said detail in a second state.
Figure 3A:
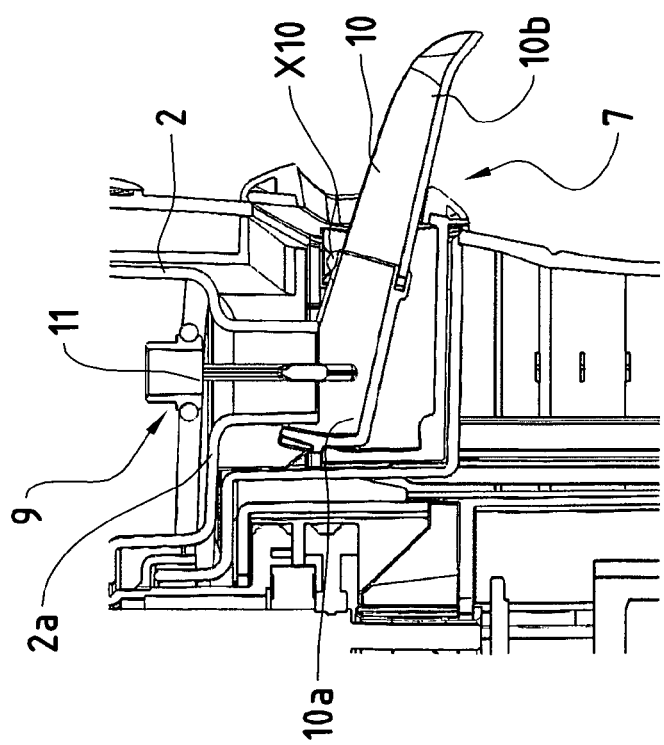
FIG. 3A is a schematic partial cross-sectional view of a vertical sectional plane of the apparatus showing a detail in a first state.
Figure 4A:
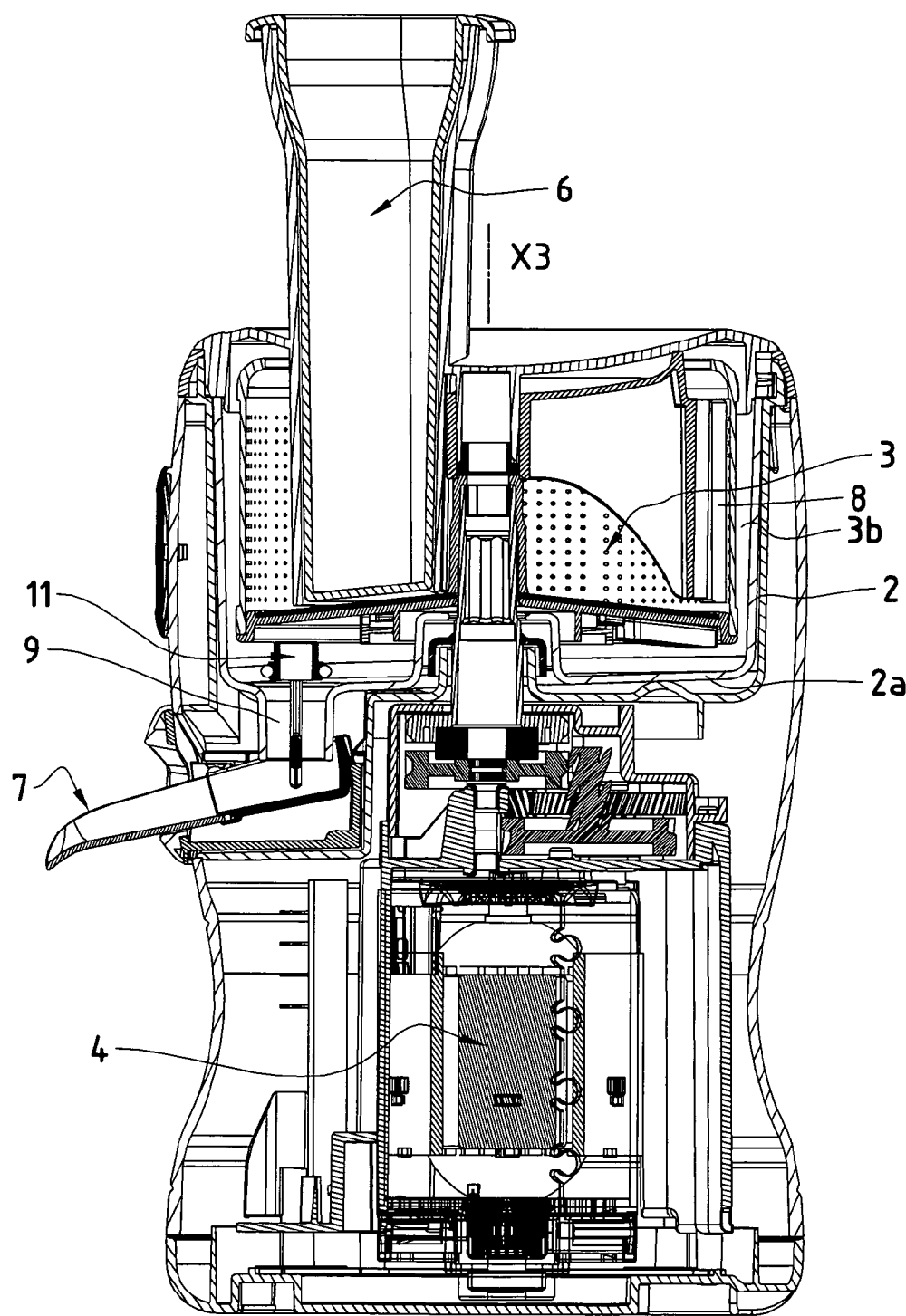
FIG. 4A is a detailed cross-sectional view of a vertical sectional plane of the apparatus according to the first embodiment.
Figure 4B:
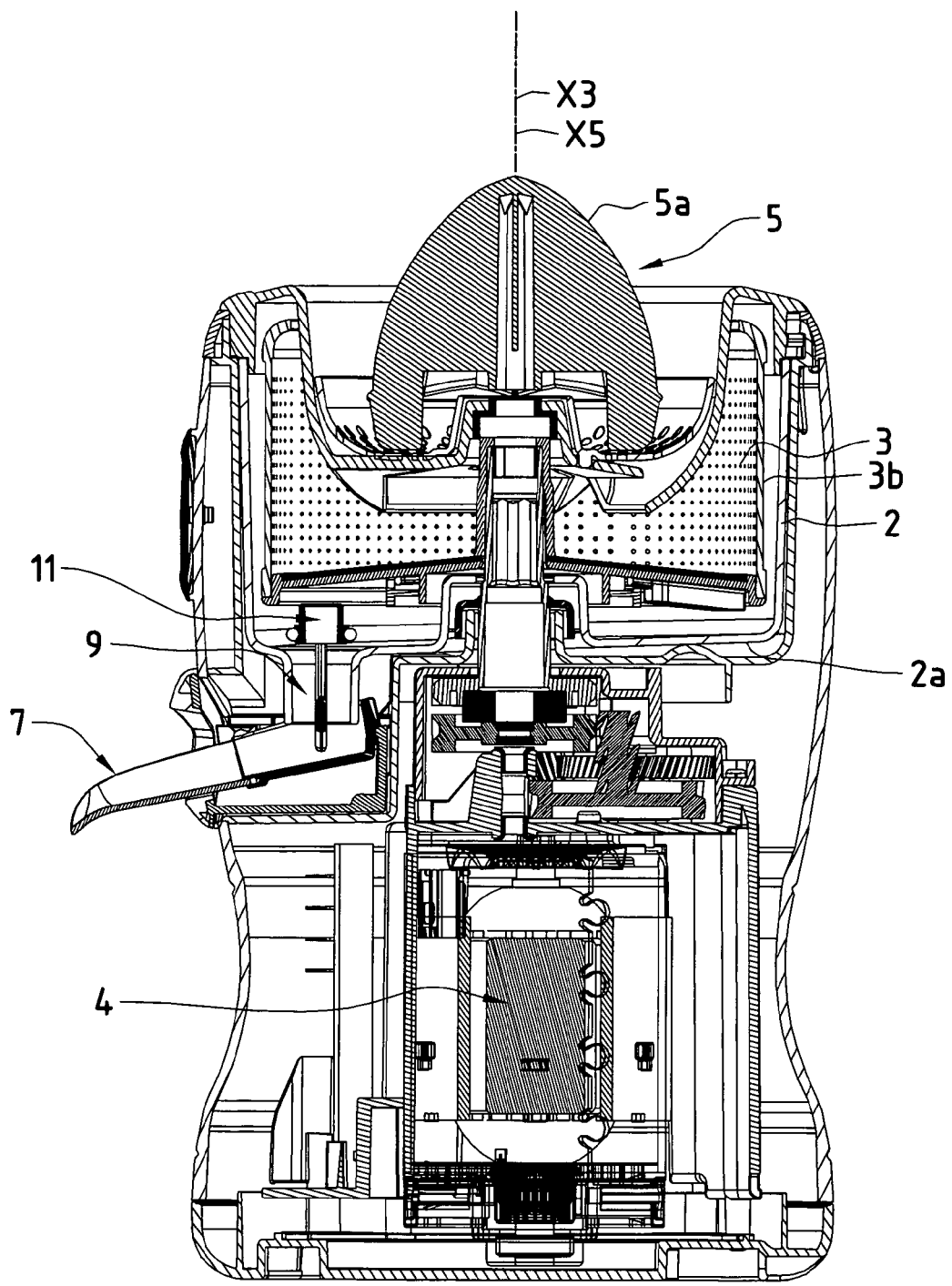
FIG. 4B is a detailed cross-sectional view of a vertical sectional plane of the apparatus according to the second embodiment.
Figure 5A:
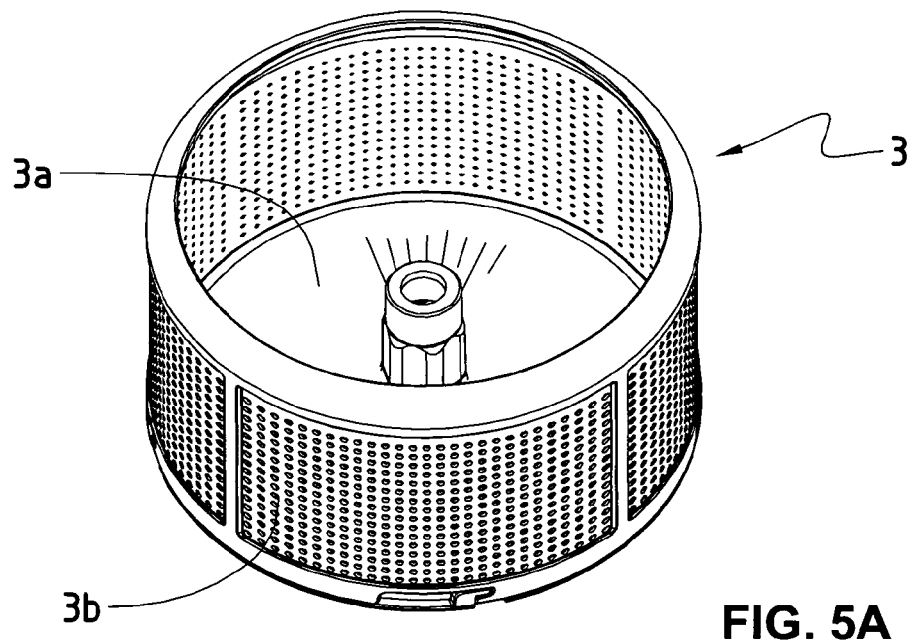
FIG. 5A is a perspective view of an assembled component (strainer) of the apparatus according to both the first and second embodiments.
Figure 5B:
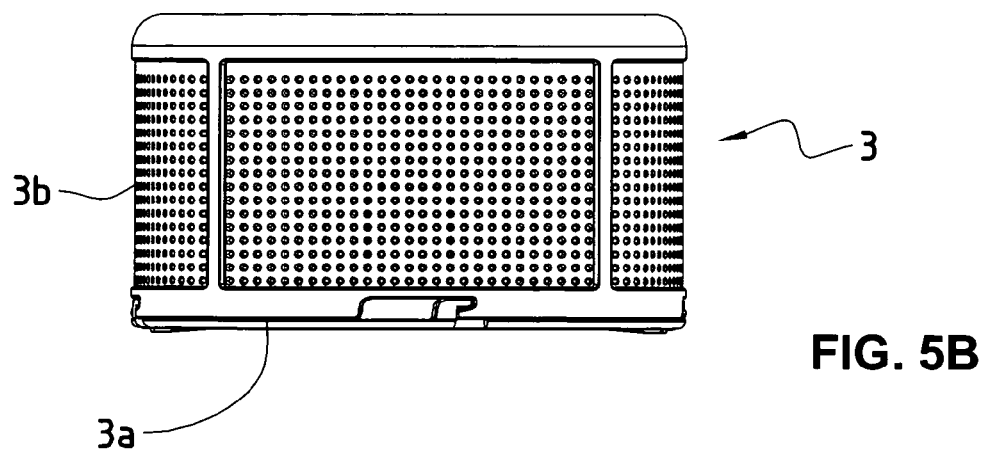
FIG. 5B is a lateral view of the assembled component of the apparatus according to both the first and second embodiments.
Figure 5C:
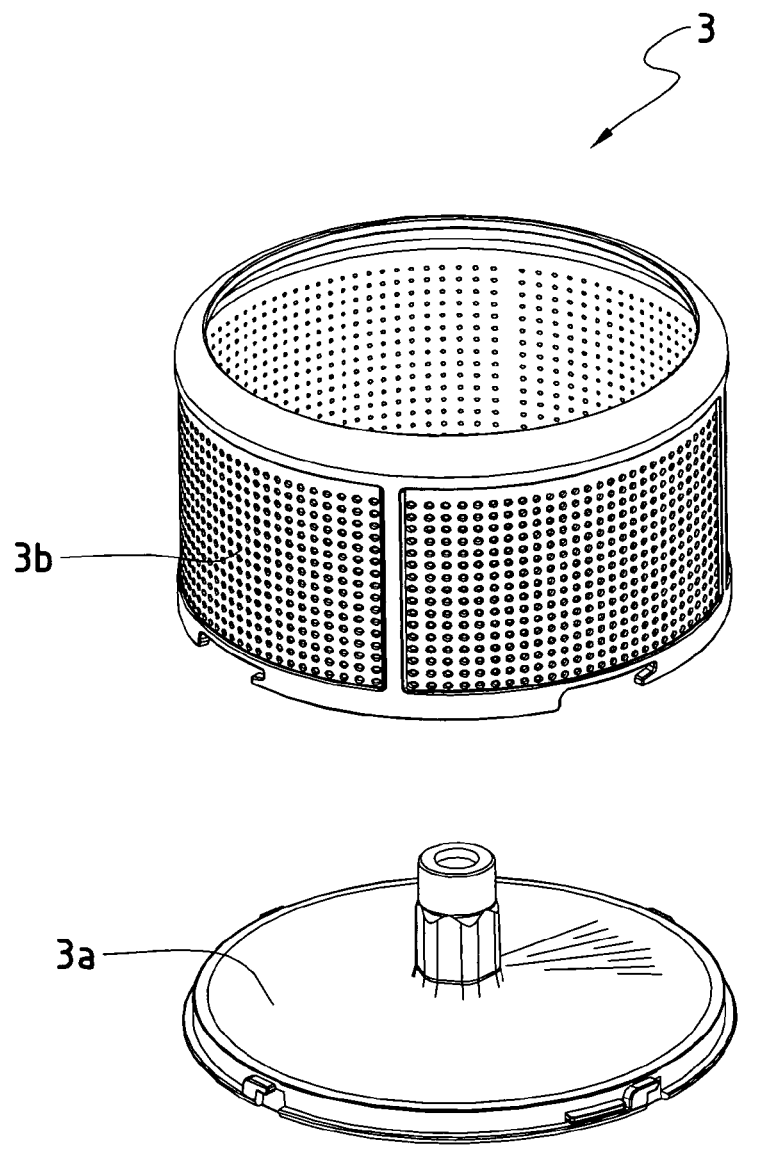
FIG. 5C is a perspective view of the disassembled component of the apparatus according to both the first and second embodiments.

An apparatus (1) for extracting juice and pulp from fruit or vegetables in order to obtain a flowable mass, such as juice or puree, comprises a receptacle (2), a cylindrical strainer (3) located within the receptacle (2) and rotatable about its axis of symmetry (X3), the cylindrical strainer (3) having a bottom (3a) and a perforated side wall (3b), a motor unit (4) for rotating the cylindrical strainer (3) about its axis of symmetry (X3), an inlet unit (6) for introducing fruit or vegetables into the strainer (3), an outlet unit (7) for collecting flowable mass from the receptacle (2). The apparatus further comprises a flexible element (8) located within the strainer (3) and urged against the inside surface of the perforated side wall (3b).

The flexible element and the inside surface of the perforated wall can be in contact with each other along a line of contact.

A surface of the flexible element can face the inside surface of the perforated wall and forms a wedge-shaped space with it which narrows towards the line of contact.

The flexible element can be a lip-shaped element.

The line of contact between the flexible element and the inside surface of the perforated wall can extend in parallel to the axis of symmetry of the cylindrical strainer.

The flexible element can be a cylindrical element, preferably having an outer diameter R2 comprised between 1/10 and 1/2 the inner diameter R1 of the cylindrical strainer.

The cylindrical element can be a cylindrical roller rotatably supported along an axis extending in parallel to the axis of symmetry of the cylindrical strainer.

The flexible element can consist of or comprise an elastomeric material, preferably a thermoplastic elastomer.

The flexible element can comprises a hard core material, preferably a metal or a thermoplastic material, and a soft cover material, preferably an elastomeric material or a thermoplastic elastomer, fitted thereon.

A first portion of the flexible element can be secured to a rigid support element extending within the strainer towards the inside surface of the perforated side wall, and a second portion of the flexible element can be urged against the inside surface of the perforated side wall. At least the second portion of the flexible element can be a soft material, preferably an elastomeric material or a thermoplastic elastomer. The rigid support can comprise a support formation and the first portion of the flexible element can comprise a flexible element formation complementary to the support formation, for receiving the flexible element formation in the support formation in a form-locking and/or force-locking manner.

The apparatus can comprise a drive shaft operatively connected to the motor unit and having a drive shaft formation, wherein the bottom of the cylindrical strainer comprises a bottom formation complementary to the drive shaft formation, for receiving the drive shaft formation in a rotationally fixed manner, and wherein the drive shaft and the bottom can be removably fitted together.

The cylindrical strainer can comprise a bottom part and a perforated side wall part which can be removably fitted together. Both the bottom part and the perforated side wall part can be made of a polymer material; or the perforated side wall part can comprise a perforated sheet made of stainless steel permanently fixed in a frame made of a polymer material; or the perforated side wall part can be made of stainless steel; and wherein the polymer material can be preferably a thermoplastic material.

According to another aspect, an apparatus (1') for extracting juice and pulp from citrus fruit comprises a receptacle (2), a strainer (3), preferably having a cylindrical shape, located within the receptacle (2) and rotatable about a strainer axis (X3), the strainer (3) having a bottom (3a) and a perforated side wall (3b), a citrus mill (5) rotatable about a citrus mill axis (X), the citrus mill (5) having a citrus mill dome (5a) provided with protrusions (5b), preferably ribs, at its outer surface, a motor unit (4) for rotating the strainer (3) about the strainer axis (X3) and for rotating the citrus mill (5) about the citrus mill axis (X5), an outlet unit (7) for collecting juice and pulp from the receptacle (2). The citrus mill (5) can be located within the strainer (3), the strainer (3) can be rotatably driven via a strainer power train operatively connected between the motor unit (4) and the strainer (3), the citrus mill (5) can be rotatably driven via a citrus mill power train operatively connected between the motor unit (4) and the citrus mill (5).

The strainer power train can have a strainer transmission ratio SR, defined as strainer rpm divided by motor rpm, and the citrus mill power train can have a citrus mill transmission ratio CR, defined as citrus mill rpm divided by motor rpm, and wherein the ratio SR/CR between the strainer transmission ratio SR and the citrus mill transmission ration CR can be comprised within 5/1 and 30/1, preferably between 10/1 and 20/1.

The strainer can have a strainer inner diameter Ri comprised between 10 cm and 30 cm, preferably between 15 cm and 20 cm.

The strainer can be preferably operated at a rotational speed comprised between 1000 rpm and 2000 rpm.

The hole diameter of the perforations of the perforated side wall can be comprised between 0.5 mm and 2 mm, preferably between 0.8 mm and 1.5 mm.

The apparatus can comprise a drive shaft operatively connected to the motor unit via the strainer power train and having a drive shaft formation, wherein the bottom of the strainer comprises a bottom formation complementary to the drive shaft formation, for receiving the drive shaft formation in a rotationally fixed manner, and wherein the drive shaft and the bottom can be removably fitted together.

The strainer can comprise a bottom part and a perforated side wall part which can be removably fitted together.

Both the bottom part and the perforated side wall part can be made of a polymer material; or wherein the perforated side wall part comprises a perforated sheet made of stainless steel permanently fixed in a frame made of a polymer material; or wherein the perforated side wall part can be made of stainless steel; and wherein the polymer material can be preferably a thermoplastic material.

An apparatus (1; 1') for processing fruit or vegetables in order to obtain a flowable mass, such as juice or puree, can comprise a receptacle (2), an extraction unit (3, 8; 3, 5) for mechanically extracting juice and pulp from the fruit or vegetables, the unit (3, 8; 3, 5) being located within the receptacle for discharging the juice and pulp into the receptacle (2), a motor unit (4) drivingly connected to the extraction unit (3, 8; 3, 5), an outlet unit (7) for collecting flowable mass from the receptacle (2). The outlet unit can comprise a spout duct (10) associated to an opening (9) at the bottom (2a) of the receptacle (2), and a valve element (11) for opening and closing the opening (2a), the spout duct (10) and the valve element (11) being coupled to each other, the spout duct (10) being pivotably supported about a horizontal axis (X10) and having an inner duct portion (10a) extending underneath the opening (9) and an outer duct portion (10b) protruding from the apparatus (1; 1'), the pivotable spout duct (10) being pivotable between a first position where the spout duct (10) forms a downward slope from its inner duct portion (10a) to its outer duct portion (10b) and where the valve element (11) is in its opened position, and a second position where the spout duct (10) forms an upward slope from its inner duct portion (10a) to its outer duct portion (10b) and where the valve element (11) is in its closed position.

The opening at the bottom of the receptacle can open into a spout duct chamber having a spout duct opening, in which chamber the spout duct can be pivotably supported with its inner duct portion located inside the chamber and with its outer duct portion protruding through the spout duct opening.

The pivotable spout duct and/or the valve element can each have a first stop and a second stop limiting their movement between the first position and the second position, respectively. The first stop and the second stop can each have a latching function enabling the spout duct and/or the valve element to click (snap) into place when reaching the first stop or the second stop.

What is claimed is:

1. An apparatus for extracting juice and pulp from fruit or vegetables in order to obtain a flowable mass, comprising:
   a receptacle;
   a cylindrical strainer located within the receptacle and rotatable about an axis of symmetry of the strainer, the strainer having a bottom and a perforated side wall;
   a motor unit configured to rotate the strainer about its axis of symmetry;
   an inlet unit configured to permit introduction of fruit or vegetables into the strainer;
   an outlet unit configured to permit collection of flowable mass from the receptacle; and
   an exchangeable extraction unit including a first extraction unit and a second extraction unit that are exchangeable with each other,
   wherein the first extraction unit, includes the cylindrical strainer and a flexible element having an elongated surface that extends in a direction of the axis of symmetry, the flexible element being located within the strainer and being urged against an inside surface of the perforated side wall to contact the inside surface of the perforated side wall along a line of contact when the strainer is rotated about the axis of symmetry of the strainer, the flexible element forming a wedge-shaped space with the inside surface which narrows towards the line of contact when the strainer is rotated about the axis of symmetry of the strainer, and
   the second extraction unit includes the strainer and a citrus mill rotatable about a citrus mill axis by the motor unit wherein the citrus mill is located within the strainer.

2. The apparatus according to claim 1, wherein the line of contact between the flexible element and the inside surface of the perforated wall extends in parallel to the axis of symmetry of the strainer.

3. The apparatus according to claim 1, wherein a portion of the flexible element has an outer diameter between $\frac{1}{10}$ and $\frac{1}{2}$ an inner diameter of the cylindrical strainer.

4. The apparatus according to claim 3, wherein the flexible element is a roller supported along an axis extending parallel to the axis of symmetry of the strainer.

5. The apparatus according to claim 1, wherein the flexible element comprises an elastomeric material.

6. The apparatus according to claim 1, wherein the flexible element comprises a hard core material, and a soft cover material fined thereon.

7. The apparatus according to claim 1, wherein a first portion of the flexible element is secured to a rigid support element extending within the strainer towards the inside surface of the perforated side wall, and a second portion of the flexible element is urged against the inside surface of the perforated side wall.

8. The apparatus according to claim 7, wherein at least the second portion of the flexible element is a soft material.

9. The apparatus according to claim 7, wherein the rigid support comprises a support formation and the first portion of the flexible element comprises a flexible element formation complementary to the support formation, for receiving the flexible element formation in the support formation in a form-locking and/or force-locking manner.

10. The apparatus according to claim 1, further comprising a drive shaft operatively connected to the motor unit and having a drive shaft formation, wherein the bottom of the cylindrical strainer comprises a bottom formation complementary to the drive shaft formation, for receiving the drive shaft formation in a rotationally fixed manner, and wherein the drive shaft and the bottom can be removably fitted together.

11. The apparatus according, to claim 1, wherein the cylindrical strainer comprises a bottom part and a perforated side wall part which can be removably fitted together.

12. The apparatus according to claim 11, wherein both the bottom part and the perforated side wall part are made of a polymer material: or wherein the perforated side wall part comprises a perforated sheet made of stainless steel permanently fixed in a frame made of a polymer material; or wherein the perforated side wall part is made of stainless steel.

13. The apparatus according to claim 1, wherein
   the strainer is rotatably driven via a strainer power train operatively connected between the motor unit and the strainer;
   the citrus mill is rotatably driven is a citrus mill power train operatively connected between the motor unit and the citrus mill.

14. The apparatus according to claim 13, wherein the strainer power train has a strainer transmission ratio SR, defined as strainer rpm divided by motor rpm, and the citrus mill power train has a citrus mill transmission ratio CR, defined as citrus mill rpm divided by motor rpm, and wherein the ratio SR, CR between the strainer transmission ratio SR and the citrus mill transmission ration CR is comprised within 5/1 and 30/1.

15. The apparatus according to claim 13, wherein the strainer has a strainer inner diameter Ri comprised between 10 cm and 30 cm.

16. The apparatus according to claim 15, wherein the strainer is operated at a rotational speed comprised between 1000 rpm and 2000 rpm.

17. The apparatus according to claim 13, wherein the hole diameter of the perforations of the perforated side wall is comprised between 0.5 mm and 2 mm.

18. The apparatus according to claim 13, further comprising a drive shaft operatively connected to the motor unit via the strainer power train and having a drive shaft formation, wherein the bottom of the strainer comprises a bottom formation complementary to the drive shaft formation, for receiving the drive shaft formation in a rotationally fixed manner, and wherein the drive shaft and the bottom can be removably fitted together.

19. The apparatus according to claim 1, wherein
the outlet unit comprises
 a spout duct associated to an opening at the bottom of the receptacle; and
 a valve element for opening and closing the opening;
 the spout duct and the valve element being coupled to each other;
 the spout duct being pivotably supported about a horizontal axis and having an inner duct portion extending underneath the opening and an outer duct portion protruding from the apparatus;
 the pivotable spout duct being pivotable between a first position where the spout duct forms a downward slope from its inner duct portion to its outer duct portion and where the valve element is in its opened position, and a second position where the spout duct forms an upward slope from its inner duct portion to its outer duet portion and where the valve element is in its closed position.

20. The apparatus according to claim 19, wherein the opening at the bottom of the receptacle opens into a spout duct chamber having a spout duct opening, in which chamber the spout duct is pivotably supported with its inner duct portion located inside the chamber and with its outer duct portion protruding through the spout duct opening.

* * * * *